United States Patent
High et al.

(10) Patent No.: US 10,427,846 B2
(45) Date of Patent: Oct. 1, 2019

(54) SYSTEM AND METHOD FOR DETERMINING PACKAGE TAMPERING

(71) Applicant: Walmart Apollo, LLC, Bentonville, AR (US)

(72) Inventors: Donald R. High, Noel, MO (US); Robert L. Cantrell, Hemdon, VA (US); John J. O'Brien, Farmington, AR (US); Brian G. McHale, Chadderton Oldham (GB); Jimmie Ray Bishop, III, Bartlesville, OK (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/979,706

(22) Filed: May 15, 2018

(65) Prior Publication Data

US 2018/0346213 A1 Dec. 6, 2018

Related U.S. Application Data

(60) Provisional application No. 62/514,128, filed on Jun. 2, 2017.

(51) Int. Cl.
| | | |
|---|---|---|
| *B65D 55/02* | (2006.01) | |
| *B65D 63/10* | (2006.01) | |
| *C09J 7/20* | (2018.01) | |
| *B26F 1/38* | (2006.01) | |

(52) U.S. Cl.
CPC ....... *B65D 55/026* (2013.01); *B65D 63/1009* (2013.01); *C09J 7/20* (2018.01); *B26F 1/384* (2013.01); *B65D 2101/00* (2013.01); *B65D 2203/12* (2013.01); *C09J 2201/20* (2013.01); *C09J 2203/338* (2013.01)

(58) Field of Classification Search
CPC ..... B26F 1/384; B65D 27/30; B65D 33/2516; B65D 33/34; B65D 55/024; B65D 55/026; B65D 55/028; B65D 55/066; B65D 63/1009; B65D 2101/00
See application file for complete search history.

(56) References Cited

U.S. PATENT DOCUMENTS

| | | |
|---|---|---|
| 4,749,084 A | 6/1988 | Pereyra |
| 4,760,919 A | 8/1988 | Pereyra |
| 4,865,198 A | 9/1989 | Butler |

(Continued)

FOREIGN PATENT DOCUMENTS

| | | |
|---|---|---|
| WO | 9300669 | 1/1993 |
| WO | 2006046992 | 5/2006 |

OTHER PUBLICATIONS

PCT; App. No. PCT/US2018/034137; International Search Report and Written Opinion dated Sep. 12, 2018.

*Primary Examiner* — George R Koch
(74) *Attorney, Agent, or Firm* — Fitch, Even, Tabin & Flannery LLP

(57) ABSTRACT

A tape dispensing system includes packaging tape an application apparatus, and an incision element. The application apparatus is configured to apply the packaging tape to a package. The incision element defines a unique pattern, and is connected to the application apparatus. Movement of the apparatus is effective to punch or incise the unique pattern defined by the incision element completely through the packaging tape and into the package as or after the packaging tape is applied to the package.

8 Claims, 5 Drawing Sheets

(56) References Cited

U.S. PATENT DOCUMENTS

| | | |
|---|---|---|
| 6,240,362 B1 | 5/2001 | Gaspard, II |
| 6,385,537 B2 | 5/2002 | Gaspard, II |
| 6,411,897 B1 | 6/2002 | Gaspard, II |
| 6,806,807 B2 | 10/2004 | Cayne |
| 7,113,071 B2 | 9/2006 | Cayne |
| 7,191,942 B2 | 3/2007 | Aptekar |
| 7,257,552 B1 | 8/2007 | Franco |
| 7,410,103 B2 | 8/2008 | Nagel |
| 7,497,379 B2 | 3/2009 | Chen |
| 7,840,427 B2 | 11/2010 | O'Sullivan |
| 7,945,469 B2 | 5/2011 | Cohen |
| 7,945,470 B1 | 5/2011 | Cohen |
| 8,160,972 B1 | 4/2012 | Tannenbaum |
| 8,554,694 B1 | 10/2013 | Ward |
| 9,066,206 B2 | 6/2015 | Lin |
| 9,202,191 B2 | 12/2015 | Bowen |
| 9,230,292 B2 | 1/2016 | Amin |
| 9,269,103 B1 | 2/2016 | Kumar |
| 9,305,310 B2 | 4/2016 | Radhakrishnan |
| 9,378,479 B2 | 6/2016 | Seifen |
| 9,459,622 B2 | 10/2016 | Abhyanker |
| 9,592,656 B1 | 3/2017 | Davies |
| 9,639,908 B1 | 5/2017 | Reiss |
| 9,718,397 B2 | 8/2017 | Kalanick |
| 9,721,224 B2 | 8/2017 | Waris |
| 9,778,057 B2 | 10/2017 | O'Mahony |
| 9,792,574 B2 | 10/2017 | Lord |
| 9,805,536 B2 | 10/2017 | Lutnick |
| 9,811,838 B1 | 11/2017 | Daire |
| 9,852,551 B2 | 12/2017 | Brinig |
| 9,902,310 B2 | 2/2018 | Fournier |
| 9,904,900 B2 | 2/2018 | Cao |
| 9,928,540 B1 | 3/2018 | Gerard |
| 9,934,530 B1 | 4/2018 | Iacono |
| 2003/0040944 A1 | 2/2003 | Hileman |
| 2003/0046173 A1 | 3/2003 | Benjier |
| 2004/0023397 A1 | 2/2004 | Vig |
| 2006/0026030 A1 | 2/2006 | Jacobs |
| 2007/0071968 A1 | 3/2007 | Hermony |
| 2007/0107828 A1 | 5/2007 | Barker |
| 2007/0192111 A1 | 8/2007 | Chasen |
| 2010/0082152 A1 | 4/2010 | Mishra |
| 2011/0059693 A1 | 3/2011 | O'Sullivan |
| 2011/0150554 A1* | 6/2011 | Shpigel ............ B41F 17/13 400/613 |
| 2012/0030133 A1 | 2/2012 | Rademaker |
| 2012/0111472 A1* | 5/2012 | Vega ............ B65B 51/067 156/64 |
| 2014/0058902 A1 | 2/2014 | Taylor |
| 2014/0130650 A1 | 5/2014 | Carey |
| 2014/0236856 A1 | 8/2014 | Baykhurazov |
| 2014/0270467 A1 | 9/2014 | Blemel |
| 2014/0278634 A1 | 9/2014 | Horvitz |
| 2014/0278851 A1 | 9/2014 | Kopanati |
| 2014/0278875 A1 | 9/2014 | Ganesh |
| 2015/0081581 A1 | 3/2015 | Gishen |
| 2015/0161563 A1 | 6/2015 | Mehrabi |
| 2015/0199632 A1 | 7/2015 | Chander |
| 2015/0206093 A1 | 7/2015 | Trew |
| 2015/0227890 A1 | 8/2015 | Bednarek |
| 2015/0242829 A1 | 8/2015 | Bhaskaran |
| 2015/0264319 A1 | 9/2015 | Wood |
| 2015/0339625 A1 | 11/2015 | Agasti |
| 2015/0347961 A1 | 12/2015 | Gillen |
| 2015/0348173 A1 | 12/2015 | Gillen |
| 2015/0363843 A1 | 12/2015 | Loppatto |
| 2016/0019669 A1 | 1/2016 | Gopalakrishnan |
| 2016/0048804 A1 | 2/2016 | Paul |
| 2016/0071056 A1 | 3/2016 | Ellison |
| 2016/0078394 A1 | 3/2016 | Fuldner |
| 2016/0086128 A1 | 3/2016 | Geiger |
| 2016/0104112 A1 | 4/2016 | Gorlin |
| 2016/0104113 A1 | 4/2016 | Gorlin |
| 2016/0155072 A1 | 6/2016 | Prodromidis |
| 2016/0189098 A1 | 6/2016 | Beaurepaire |
| 2016/0195404 A1 | 7/2016 | Prasad |
| 2016/0225115 A1 | 8/2016 | Levy |
| 2016/0328678 A1 | 11/2016 | Gillen |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2016/0379167 A1 | 12/2016 | Raman |
| 2017/0032341 A1 | 2/2017 | Johnsrud |
| 2017/0083862 A1 | 3/2017 | Loubriel |
| 2017/0089710 A1 | 3/2017 | Slusar |
| 2017/0091891 A1 | 3/2017 | Van Der Berg |
| 2017/0124510 A1 | 5/2017 | Caterino |
| 2017/0140326 A1 | 5/2017 | Rhyu |
| 2017/0310770 A1 | 10/2017 | Samaan |
| 2017/0351994 A1 | 12/2017 | Waris |
| 2018/0096414 A1 | 4/2018 | Iacono |

\* cited by examiner

SYSTEM AND METHOD FOR DETERMINING PACKAGE TAMPERING

CROSS-REFERENCE TO RELATED APPLICATION

This application claims the benefit of the following U.S. Provisional Application No. 62/514,128 filed Jun. 2, 2017, which is incorporated herein by reference in its entirety.

TECHNICAL FIELD

These teachings relate generally to detecting and preventing tampering with packages.

BACKGROUND

Packages are commonly shipped between shipping sources and shipping destinations. One problem associated with the shipping process is tampering with packages. For example, an unauthorized person may open the package and steal the contents. In other examples, an unauthorized person may also add something harmful to the package. The fear of having a package being tampered with sometimes prevents some individuals from purchasing an item if the item needs to be shipped. This situation leads to lost sales for many businesses.

Various approaches have been attempted to prevent or detect or discourage tampering. For example, a customer may simply visually inspect a package for tampering. However, visual inspection may be ineffective since many individuals are very adept at tampering with a package, leaving few if any visible signals or signs that can be detected by humans.

In other examples, various types of sealing or locking mechanisms may be used on packages. However, these types of measures are typically expensive to implement, and customers do not often wish to pay for the extra costs of these approaches. These approaches may also be time consuming to install, or it may make opening the package difficult for the customer and so negatively impact the customer experience.

BRIEF DESCRIPTION OF THE DRAWINGS

The above needs are at least partially met through provision of approaches that detect and/or discourage tampering with packages as described in the following detailed description, particularly when studied in conjunction with the drawings, wherein.

DETAILED DESCRIPTION

Figure 1:
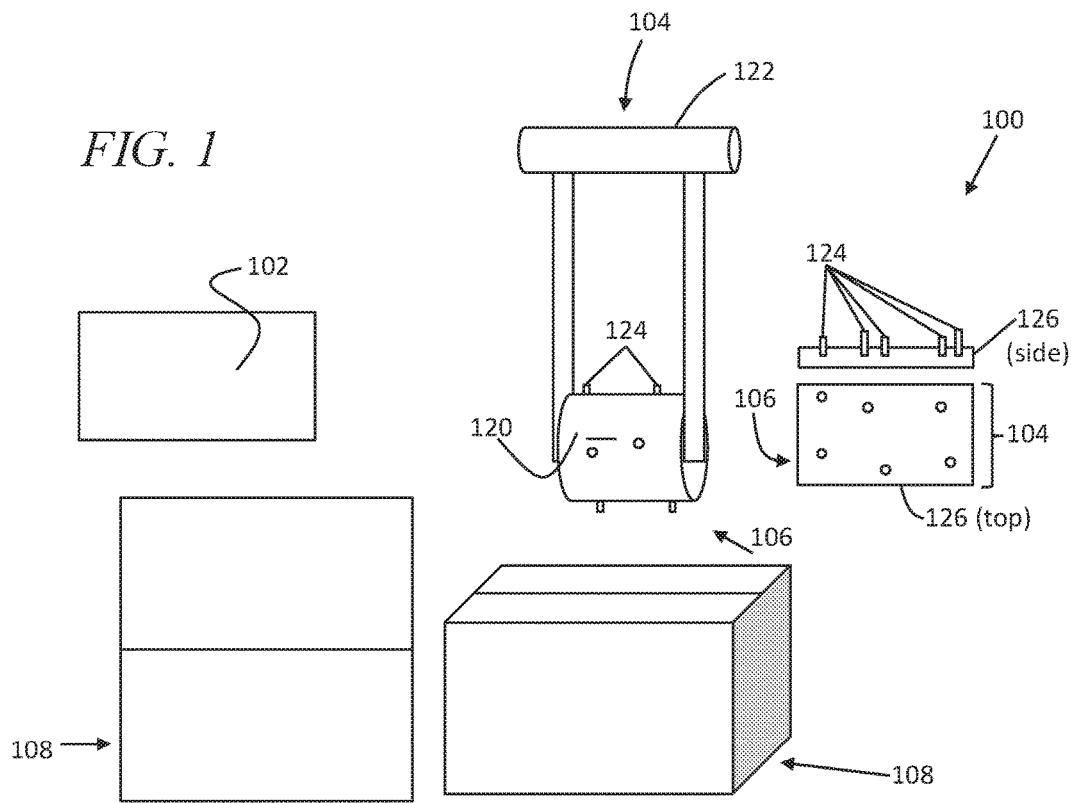
FIG. 1 comprises a diagram of a tape dispensing system as configured in accordance with various embodiments of these teachings.

Generally speaking, many of these embodiments provide for a system and method that easily detect tampering with packages shipped from a shipping source and received at a shipping destination. A packing tape is applied to a package and has a pattern of protrusions passing there through. Tampering can be detected in a variety of different ways such as visually inspecting the package, or automatically and electronically comparing an image of the package made at shipment and to an image of the package when the package reaches its destination.

In many of these embodiments, a tape dispensing system includes packaging tape, an application apparatus, and an incision element. The application apparatus is configured to apply the packaging tape to a package. The incision element defines a unique pattern, and is connected to the application apparatus. Movement of the apparatus is effective to punch or incise the unique pattern defined by the incision element completely through the packaging tape and into the package as or after the packaging tape is applied to the package. A first incised pattern is formed through the tape, and a second incised pattern is formed in the package. An inspection is performed to determine if the first incised pattern through the tape aligns with the second incised pattern in the package.

In aspects, the inspection is a visual inspection of the package at a shipping destination. In other aspects, the inspection is a comparison of first images obtained of the package at a shipping source with second images obtained of the package at the shipping destination.

In some examples, the application apparatus is a roller. In other examples, the unique pattern is a random pattern created automatically or a predefined pattern created by a user. In still other examples, the incision element comprises prongs. Other examples of application apparatuses, unique patterns, and incision elements are possible In others of these embodiments, a unique pattern is determined. Packaging tape is applied to a package and the unique pattern is punched or incised completely through the packaging tape and into the package as or after the packaging tape is applied to the package. In so doing, a first incised pattern is formed through the tape, and a second incised pattern is formed in the package. The package is visually inspected to determine if the first incised pattern through the tape aligns with the second incised pattern in the package.

In still others of these embodiments, a system for determining package tampering includes a communication network, a tape dispensing device, a first scanner, a second scanner, a database, and a control circuit. The tape dispensing device is disposed at a shipping source and is configured to dispense packing tape onto a package to seal the package. The tape dispensing device is further configured to incise or punch first openings defining a unique pattern completely through the tape as the tape is dispensed onto the package, and to incise or punch corresponding second openings defining the unique pattern into a body of the package.

The first scanner is disposed at the shipping source, is coupled to the communication network, and is configured to obtain a first image of the package including the unique pattern incised or punched through the tape. The first scanner is configured to transmit the first image to a central processing center via the communication network.

The database is coupled to the communication network and is disposed at the central processing center. The database is configured to receive and store the first image.

The control circuit is coupled to the communication network and the database. The control circuit is disposed at the central processing center.

The second scanner is disposed at a shipping destination and is configured to obtain a second image of the package after the package has been received at the shipping destination. The second scanner is configured to transmit the second image to the control circuit at the central processing center over the communication network.

The control circuit is configured to retrieve the first image from the database and the second image from the second scanner. The control circuit is further configured to perform a comparison between the first image and the second image, and based upon the comparison to determine whether the unique pattern has changed between the shipment of the package from the shipping source to the shipping destination.

In aspects, the comparison determines whether the first openings align with the second openings. In other examples, the control circuit is further configured to issue an alert when the unique pattern has changed.

In still other examples, the tape dispensing device is configured to deposit an ink into the second openings in the body of the package. The ink may be a visible ink or an invisible ink. In aspects, the first openings and the second openings comprise nano-holes. In other aspects, the tape dispensing device comprises a roller that incises or punches the unique pattern.

In still other examples, the second scanner is a portable hand-held device. In yet other examples, the package moves via a conveyor belt in the shipping center as the packing tape is dispensed.

In others of these examples, a conventional reinforced tape with adhesive (e.g., the water activated adhesive) is applied to a package. After the tape is applied to the package, a collection of perforations is added to the tape and the package. The depth of, width of, and pattern, if at all the perforations may vary.

These perforations form a unique identifier (e.g., similar to a fingerprint) on the package and changes to this identifier may be detected through a video analytics system which can compare the package as it was ready for shipment with the package at the customer's location. In aspects, the perforations could be nano-perforations (barely visible or invisible to the naked eye).

In examples, perforated tape that leaves visible marks on the cardboard The marks create a pattern for identifying the origin of shipping, the retail store shipped from, the person doing the shipping, delivery information, and the identity of the shipped product, to mention a few examples for identifying information, such as a UPC code.

In still other examples, an application scans images of the perforations, compares against shipping image of perforations to the received package. A naked eye determination by a human can also be made where a person can visually determine if the perforations through the tape align with the perforations in the package.

In still other approaches, the detection is accomplished using standard packing tape and a spiked roller that is rolled over the tape and box after the box is sealed. The roller can be rolled by hand or by machine and may be a separate tool within the system or a part of the tape installer itself. In aspects, the roller creates a micro pattern of holes (e.g., dozens to hundreds) through the tape and into the box. In other aspects, some of these holes can be seen by the naked eye, and they could also be nano-holes, so small it take a machine to read them effectively. If an unauthorized person removes the tape, it will be impossible or nearly so for them to replace the tape so that all the holes line back up. A person could easily detect non-alignment of the holes through the tape and in the box. Depending on the tape used, the tape could also be designed to fracture if people attempt to remove it, further adding to the impossibility of replacing the tape.

In aspects, the holes are created by the spikes on the roller, and the spikes can be of varied heights, such that the pattern and depth of holes become signatures for the sealer before sending a package to a destination. The recipient could assure not only that the box has remained sealed, but that the pattern belongs to the accepted sender. Additionally, boxes could also be made to have a special layer, for example, an interior foil sheet that will be exposed by a perforation and could be machine readable as exposed.

Figure 2:
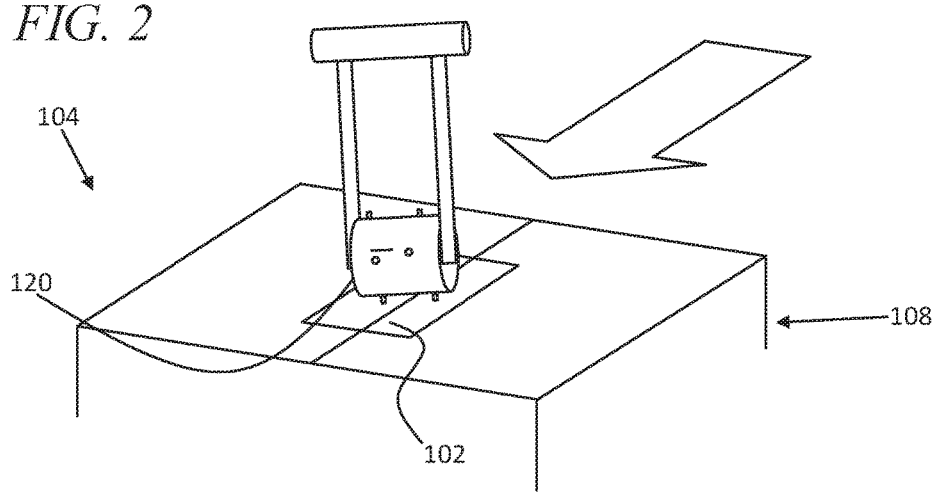
FIG. 2 comprises a diagram of manually using the tape dispensing system of FIG. 1 configured in accordance with various embodiments of these teachings.
Figure 3:
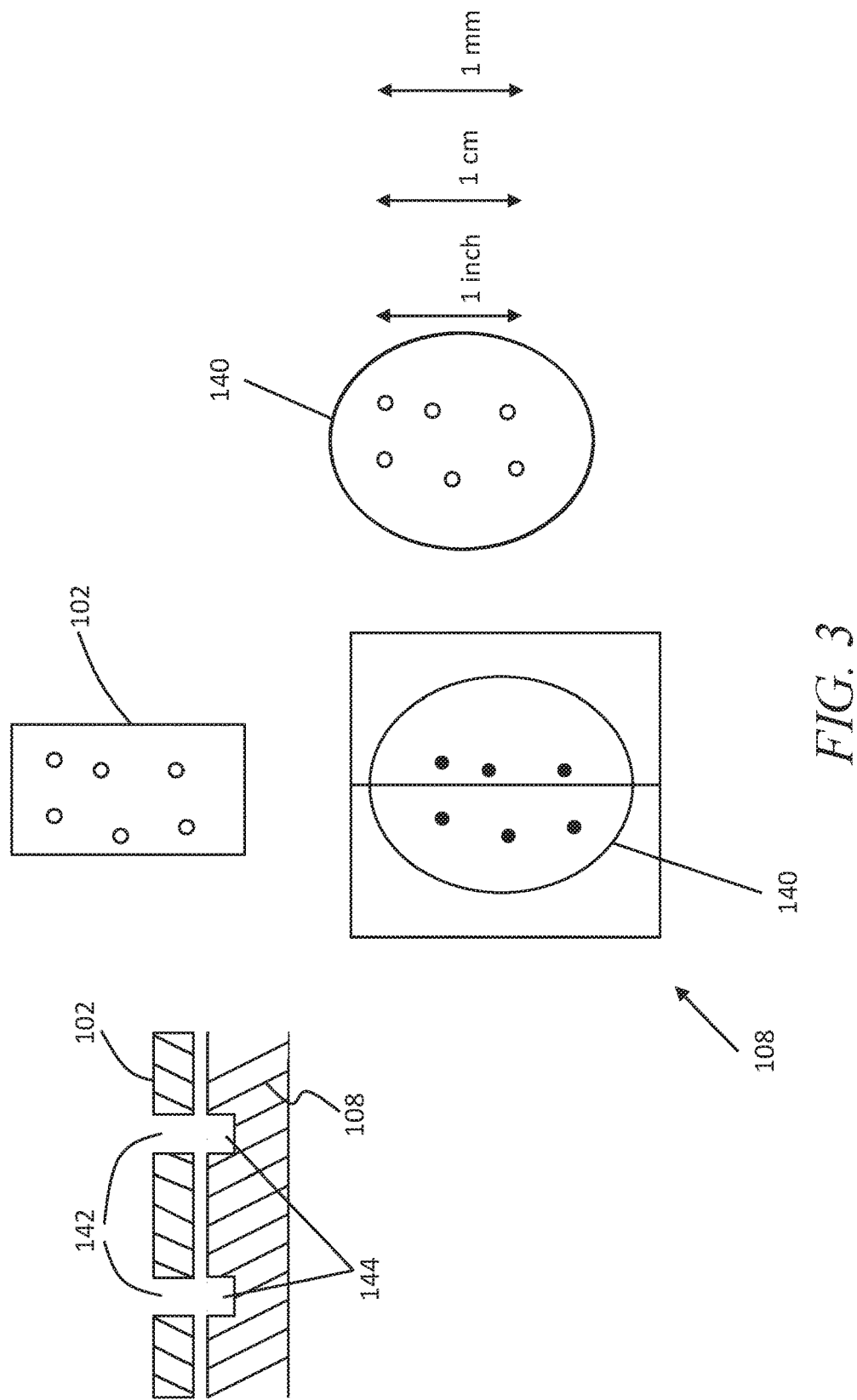
FIG. 3 comprises a diagram showing aspects of the pattern on the package of FIG. 1 and FIG. 2 as configured in accordance with various embodiments of these teachings.

Referring now to FIG. 1, FIG. 2, and FIG. 3, on example of a system 100 that detects tampering is described. The system 100 includes a tape dispensing system includes packaging tape 102, an application apparatus 104, and an incision element 106. The tape 102 is applied to a package 108.

The packaging tape 102 is any type of suitable tape that can be used to seal a package 108. In some examples, the tape may have an adhesive to attach it to the package 108. In other examples, the tape includes water activated adhesive. The package 108 may be any type of shipment container such as a cardboard box, an envelope, or a wooden crate to mention a few examples.

The application apparatus 104 is any type of device that applies the tape 102 to a package. In one example shown in FIG. 1, the apparatus 104 includes a roller 120, which rotates when pushed along by a handle 122. In another example, the application apparatus 104 includes a plate 126.

The incision element 106 in this example are spikes 124 on the roller 120 or the plate 126. The spikes 124 are configured to be of any suitable length and are arranged in a predetermined pattern on the roller 120 or plate 126. In some examples, the spikes 124 are of the same length. In other examples, the spikes 124 are of different lengths. When the spikes are of different length, the holes in the box are of different depths. In this case, both the pattern and depth of holes become signatures that are evaluated at the destination. The roller 120, plate 126, and the spikes 124 may be constructed of any suitable material such as a metal or a hard plastic.

In other examples, the incision element 106 can be knife-like elements or other elements capable of cutting through the tape 102 and into the box 108. In other examples, combinations of spikes and knife-like elements are used. Unique patterns are formed by these elements as the tape 102 is applied to the box 108 such that the pattern on one box will differ from the pattern on another box.

Referring especially to FIG. 2, one example of an application process is shown. The application apparatus 104 is configured to apply the packaging tape 102 to the package 108. The incision element 106 defines a unique pattern. In this example, a person grasps or engages the handle 122 to move the roller 120.

Movement of the roller 120 across the tape 102 is effective to punch or incise the unique pattern defined by the spikes 124 completely through the packaging tape 102 and into the package 108 as the packaging tape 102 is applied to the package 108. In these regards, a first incised pattern is formed through the tape 102, and a second incised pattern is formed in the package 108. In some examples, the tape 102 is first applied to the package 108 and then the roller or plate is applied to the tape 102 and package 108. In other examples, the tape 102 is applied to the package 108 as the incisions are made through the tape 102 and into the package 108.

An inspection is performed to determine if the first incised pattern through the tape aligns with the second incised pattern in the package 108. The inspection may be a manual inspection at the destination (e.g., a human viewing the package), or may be automated by, in one example, comparing an image of the package leaving the shipping source to another image of the package after it arrives at a shipping destination.

For any given package and where a roller is used, the beginning point where the roller engages the tape and the ending point where the roller disengages the tape are different as between packages. Thus, each package has a unique pattern incised through the tape and into the package.

If a plate is used, an automated process may move and remove spikes 124 from the plate and form unique patterns of spikes on the plate. For instance, a random number may be generated to determine the number and pattern of spikes deployed on the plate. This number changes from package to package resulting in a unique pattern of spikes deployed on the plate for a given package. The height of the spikes may also be varied. In these regards, the spikes are alternatively retractable and extendable from the plate, and electronic signals may be sent to mechanisms that are configured to vary the spikes from a fully extended (engaged) position to a retracted (dis-engaged) position.

In another example, the plate 126 is pressed through the tape 102 and into the box. More specifically, the tape 102 may be applied to the box 108, and then the plate 126 is pressed on to the tape 102 to incise a pattern through the tape 102 and into the box 108.

Referring especially to FIG. 3, one example of patterns produced through the tape 102 and into the package 108 is described. In the example of FIG. 3, a pattern 140 is formed in the tape 102 and into the package 108. First holes or openings 142 extend through the tape 102 and match holes or openings 144 that extend into the package 108. It will be appreciated that the holes or openings 142 and 144 align perfectly (or nearly perfectly) after the tape 102 is applied to the package 108 by the apparatus 104. However, if the tape 102 is tampered with, moved, removed, removed and re-applied then the holes or openings 142 and 144 will likely not align (or at least not completely align and tampering can be detected.

As mentioned, an inspection is performed to determine if the first incised pattern through the tape aligns with the second incised pattern in the package 108. The inspection may be a manual inspection at the destination (e.g., a human viewing the package), or may be automated by, in one example, comparing an image of the package leaving the shipping source to another image of the package after it arrives at a shipping destination.

The holes (or openings)-per-square unit (e.g., per-square-inch, per-square-millimeter, or per-square-centimeter) can vary depending upon the security level needed. For example, a larger number of hole-per-unit can be used when a greater level of security is desired. A smaller number of holes-per-unit can be used when a lower level of security is desired. Customers may pay for different levels of security. The size of the holes may vary as well. In some example, the holes may be large enough to be seen by the naked human eye (e.g., 0.1 mm in diameter), while in other examples, the holes are nano-holes, which or difficult or impossible to detect with the human eye.

In some examples, the holes 144 is the package 108 may be filled (or partially filled) with an ink or some other element. In aspects, the ink may be a visible ink or an invisible ink. The use of an ink may make it easier for detection of the pattern formed by the holes, either by the human eye or by image comparison. Also as mentioned and in some aspects, the holes may be of varying heights. In this case, a determination is also made not only of the pattern, but the depth of the holes. This can be made according to various image processing approaches as known to those skilled in the art.

Figure 4:
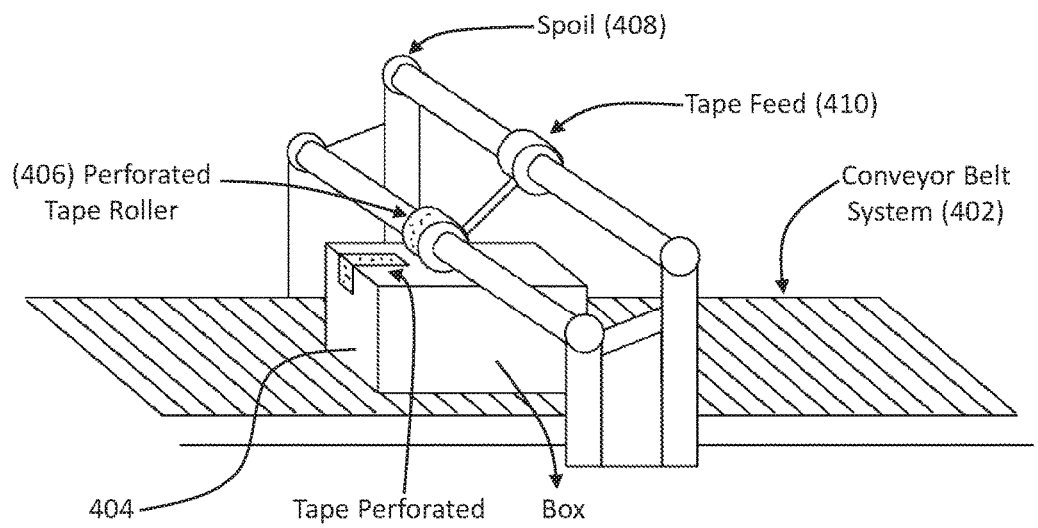
FIG. 4 comprises an automated tape dispensing device as configured in accordance with various embodiments of these teachings.
Figure 5:
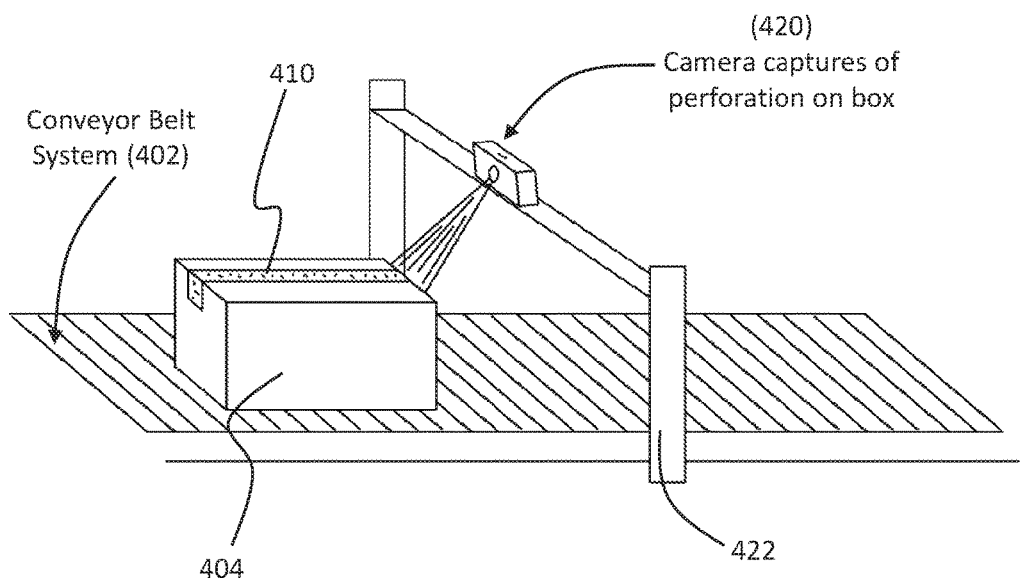
FIG. 5 comprises an automated camera system on an assembly line as configured in accordance with various embodiments of these teachings.

Referring now especially to FIG. 4 and FIG. 5, one example of a system that automatically applies tape and detects tampering is described. A conveyor belt 402 moves a package 404 past a tape application apparatus 406. A first spool 408 holds tape 410 that is applied by a perforated tape roller 412 (that is held by a second spool 414).

Movement of the tape roller 412 across the tape 410 is effective to punch or incise the unique pattern completely through the packaging tape 410 and into the package 404 as the packaging tape 410 is applied to the package 404. In these regards, a first incised pattern is formed through the tape 410, and a second incised pattern is formed in the package 404. The patterns align after application of the tape 410 to the package 404.

Referring now to FIG. 5, one example of a camera system at the shipping source and, in aspects, also at the shipping destination, is described. The package 404 moves along the conveyor belt and a camera 420 mounted on a bracket 422 captures a first image of the package. A similar camera captures a second image of the package 404 after the package reaches the shipping destination. A comparison is made between the first image and the second image to determine if the pattern is the same (indicating the holes or openings in the box align with the holes or openings in the tape). If a match is determined, a determination is made that no tampering has occurred. However, if a match is not determined, then tampering is determined to occur. In example, a threshold may be used to determine if tampering has occurred (e.g., a predetermined number of holes or openings as between the package and the tape do not align).

Figure 6:
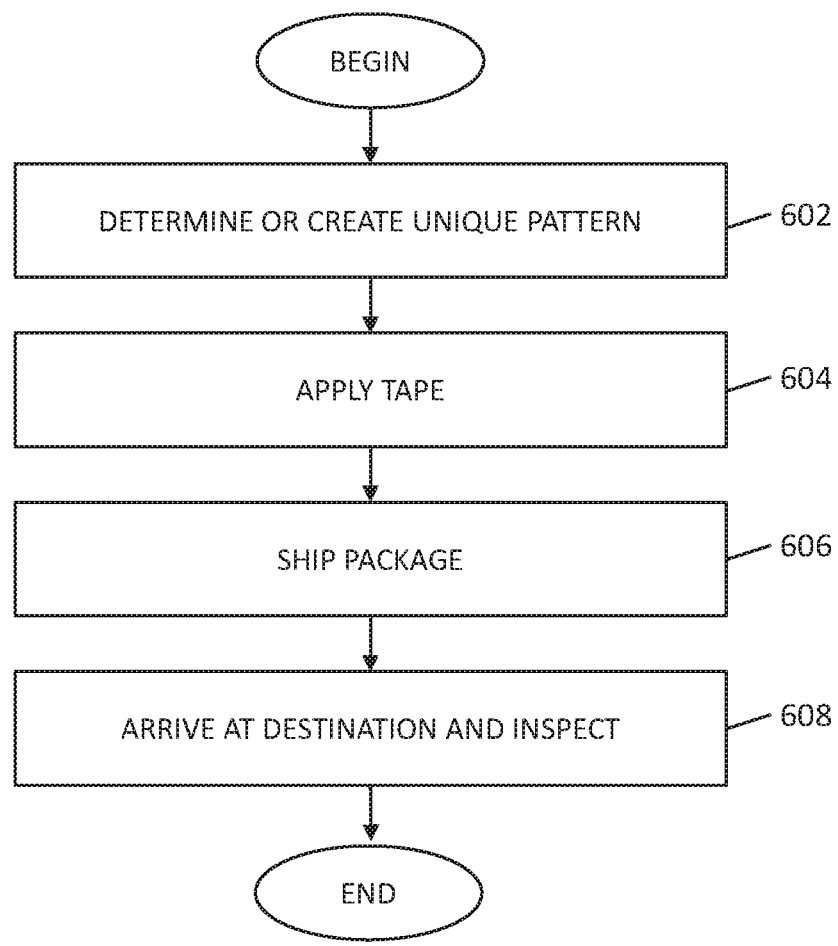
FIG. 6 comprises a flow chart of an approach of tampering detection as configured in accordance with various embodiments of these teachings.

Referring now to FIG. 6, one example of an approach for detecting package tampering is described. The approach of FIG. 6 relies upon a visual inspect by a human. In other examples, an automatic approach may be utilized.

At step 602, a unique pattern is determined or created. The unique pattern may in some examples be determined by a roller that is being applied to tape. In other examples, the unique pattern is applied by a plate with protrusions that is applied to the tape and package.

The unique pattern is applied through the tape and into the package. In one example, the unique form is formed by protrusions on a roller. In another example, the unique pattern is formed by protrusions on a flat plate.

At step 604, packaging tape is applied to a package while the unique pattern is simultaneously punched or incised completely through the packaging tape and into the package as the packaging tape is applied to the package. In so doing, a first incised pattern is formed through the tape, and a second incised pattern is formed in the package. In other examples, the tape is first applied to the package and then the roller or plate is applied to the tape and package.

At step 606, the package is shipped from the shipping source to a shipping destination. In one example, the shipping source is a warehouse and the shipping destination is a home. In another example, the shipping source is a first warehouse and the shipping destination is a second warehouse.

At step 608, the package arrives at the destination and is visually inspected to determine if the first incised pattern through the tape aligns with the second incised pattern in the package.

Figure 7:
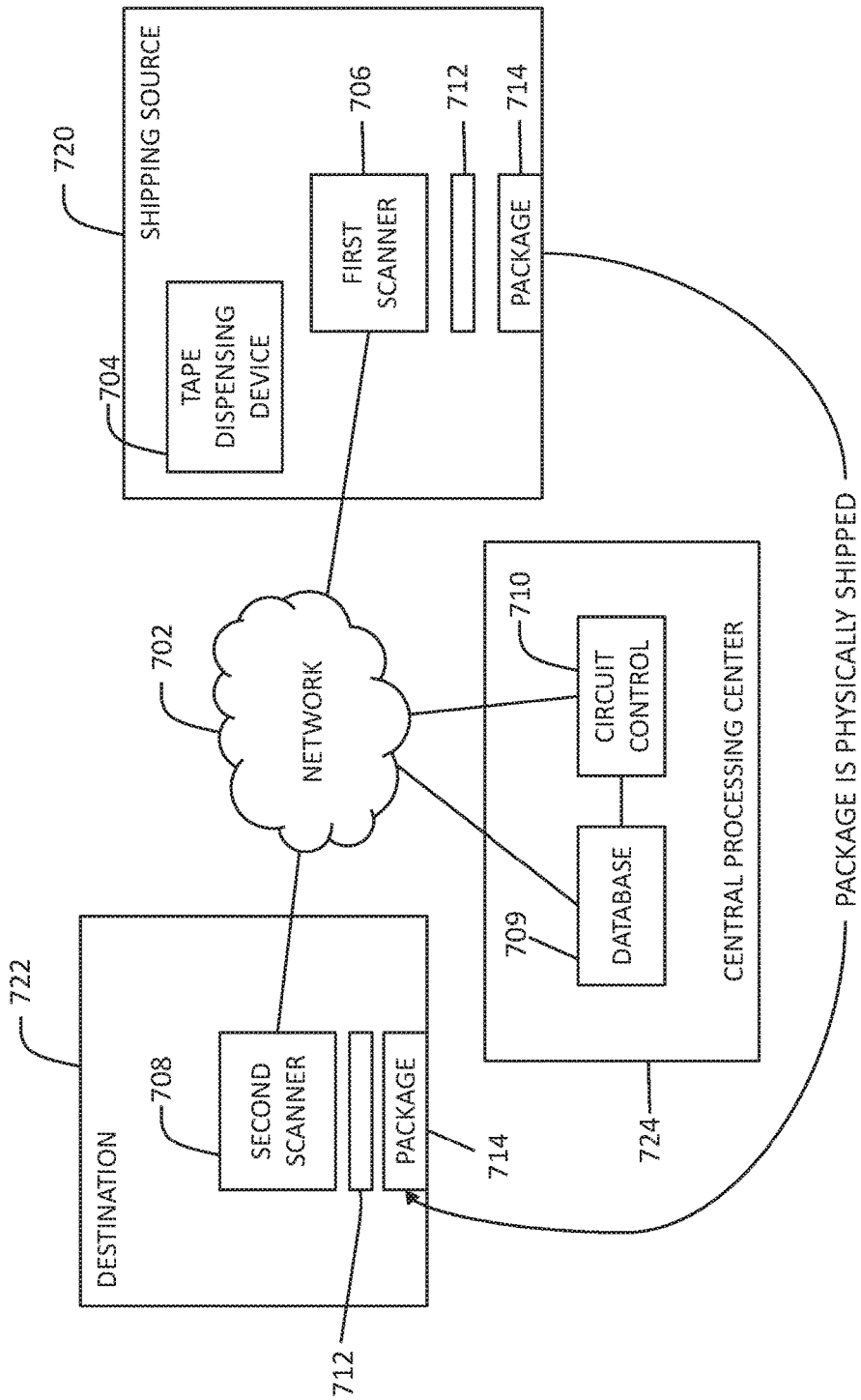
FIG. 7 comprises a block diagram of a system for the detection of tampering detection as configured in accordance with various embodiments of these teachings.

Referring now to FIG. 7, a system 700 for determining package tampering is described. The system 700 includes a communication network 702, a tape dispensing device 704, a first scanner 706, a second scanner 708, a database 709, and a control circuit 710.

The communication network 702 is any type of computer or communication network and may include routers, gateways, and servers to mention a few examples of devices that can form or be utilized in the network 702. The network 702 may also be combinations of various types of networks.

The tape dispensing device 704 is disposed at a shipping source 720 and is configured to dispense packing tape 712 onto a package 714 to seal the package 714. The tape dispensing device 704 is further configured to incise or punch first openings defining a unique pattern completely through the tape 712 as the tape 712 is dispensed onto the package 714, and to incise or punch corresponding second openings defining the unique pattern into a body of the package 714. In one example, the tape dispensing device 704 is a roller with spikes or protrusions that define a pattern. In another example, the tape dispensing device 704 is a plate with spikes or protrusions that define a pattern. The patterns as applied between different boxes are unique. In some examples, the tape is first applied to the package and then the roller or plate is applied to the tape and package. In other examples, the tape is applied to the package as the incisions are made through the tape and into the package.

The first scanner 706 and the second scanner 708 are devices that obtain images (or other sensed information or readings) that show the tape 712 as applied to the package 714. In one example, the first scanner 706 and the second scanner 708 are cameras that obtain images in any type of image file format.

The first scanner 706 is disposed at the shipping source 720, is coupled to the communication network 702, and is configured to obtain a first image of the package including the unique pattern incised or punched through the tape 712. The first scanner 706 is configured to transmit the first image to a central processing center 724 via the communication network 702. The central processing center 724 may be at any location that is accessible to multiple shipping sources and destinations via the network 702.

The database 709 is any type of electronic memory device. The database 709 is coupled to the communication network 702 and is disposed at the central processing center 724. The database 709 is configured to receive and store the first image.

The control circuit 710 is coupled to the communication network 702 and the database. The control circuit 710 is disposed at the central processing center 724.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 710 may be configured (for example, by using corresponding programming stored in a memory as will be well understood by those skilled in the art) to carry out one or more of the steps, actions, and/or functions described herein.

The second scanner 708 is disposed at a shipping destination 722 and is configured to obtain a second image of the package 714 after the package 714 has been received at the shipping destination 722. The second scanner 708 is configured to transmit the second image to the control circuit at the central processing center 724 over the communication network 702. The first and second images may be in any type of image or image file format or conform to any type of protocol.

The control circuit 710 is configured to retrieve the first image from the database 709 and the second image from the second scanner 708. The control circuit 710 is further configured to perform a comparison between the first image and the second image, and based upon the comparison to determine whether the unique pattern has changed between the shipment of the package 714 from the shipping source 720 to the shipping destination 722.

In aspects, the comparison determines whether the first openings align with the second openings. In other examples, the control circuit 710 is further configured to issue an alert when the unique pattern has changed.

In still other examples, the tape dispensing device 704 is configured to deposit an ink into the second openings in the body of the package 714. The ink may be a visible ink or an invisible ink. The first openings and the second openings comprise nano-holes. The tape dispensing device 704 comprises a roller that incises or punches the unique pattern.

In other examples, the second scanner 708 is a portable hand-held device. In yet other examples, the package 714 moves via a conveyor belt in the shipping center 720 as the packing tape 712 is dispensed.

In others of these examples, a conventional reinforced tape with adhesive (e.g., the water activated adhesive) is applied to a package 714. After the tape is applied to the package, a collection of perforations is added to the tape and the package. The depth of, width of, and pattern, if at all the perforations may vary.

These perforations form a unique identifier (e.g., similar to a fingerprint) on the package and changes to this identifier may be detected through a video analytics system which can compare the package as it was ready for shipment with the package at the customer's location. In aspects, the perforations could be nano-perforations (barely visible or invisible to the naked eye).

In examples, perforated tape that leaves visible marks on the cardboard The marks create a pattern for identifying the origin of shipping, the retail store shipped from, the person doing the shipping, delivery information, and the identity of the shipped product, to mention a few examples for identifying information, such as a UPC code.

In still other examples, an application scans images of the perforations, compares against shipping image of perforations to the received package 714. A naked eye determination can also be made where a person can visually determine if the perforations through the tape align with the perforations in the package 714.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A tape dispensing system, the system comprising:
    packaging tape including a first portion and a second portion;
    an application apparatus that is configured to apply the packaging tape to a first package and a second package;
    an incision element that is configured at a first time to define a first unique pattern and that is configured at a second time to define a second unique pattern, the incision element being connected to the application apparatus, wherein the incision element comprises multiple prongs and a number of the prongs and a height of each of the prongs are varied to obtain the first unique pattern at the first time and are readjusted at the second time to obtain the second unique pattern;
    such that a movement of the application apparatus is effective to punch or incise the first unique pattern defined by the incision element completely through the first portion of the packaging tape and into the first package as indentations as or after the first portion of the packaging tape is applied to the first package at the first time;
    such that a movement of the application apparatus is effective to punch or incise the second unique pattern defined by the incision element completely through the second portion of the packaging tape and into the second package as indentations as or after the second portion of the packaging tape is applied to the second package at the second time;
    wherein a first incised pattern is formed through the first portion of the tape, and a second incised pattern is formed in the first package, and wherein a first inspection is performed to determine if the first incised pattern through the first portion of the tape aligns with the second incised pattern in the first package;
    wherein a third incised pattern is formed through the second portion of the tape, and a fourth incised pattern is formed in the second package, and wherein a second inspection is performed to determine if the third incised pattern through the second portion of the tape aligns with the fourth incised pattern in the second package;
    wherein the indentations in the first package are filled with ink to facilitate the first inspection and the indentations in the second package are filled with ink to facilitate the second inspection.

2. The system of claim 1, wherein the inspection is one of: a visual inspection of the package at a shipping destination, or a comparison of first images obtained of the package at a shipping source with second images obtained of the package at the shipping destination.

3. The tape dispensing system of claim 1, wherein the application apparatus is a roller.

4. The tape dispensing system of claim 1, wherein the unique pattern is one of: a random pattern created automatically or a predefined pattern created by a user.

5. A method of detecting tampering with a package that occurs between a shipping source and a shipping destination, the method comprising:
    providing packaging tape, the packaging tape including a first portion and a second portion, the packaging tape being dispensed by an application apparatus;
    providing an incision element that is configured at a first time to define a first unique pattern and that is configured at a second time to define a second unique pattern, the incision element being connected to the application apparatus, wherein the incision element comprises multiple prongs and a number of the prongs and a height of each of the prongs are varied to obtain the first unique pattern at the first time and are readjusted at the second time to obtain the second unique pattern;
    applying packaging tape to a package and punching or incising the first unique pattern defined by the incision element completely through the first portion of the packaging tape and into the first package as indentations as or after the first portion of the packaging tape is applied to the first package at the first time;
    such that a movement of the application apparatus is effective to punch or incise the second unique pattern defined by the incision element completely through the second portion of the packaging tape and into the second package as indentations as or after the second portion of the packaging tape is applied to the second package at the second time;
    wherein a first incised pattern is formed through the first portion of the tape, and a second incised pattern is formed in the first package, and wherein a first inspection is performed to determine if the first incised pattern through the first portion of the tape aligns with the second incised pattern in the first package;
    wherein a third incised pattern is formed through the second portion of the tape, and a fourth incised pattern is formed in the second package, and wherein a second inspection is performed to determine if the third incised pattern through the second portion of the tape aligns with the fourth incised pattern in the second package;
    wherein the indentations in the first package are filled with ink to facilitate the first inspection and the indentations in the second package are filled with ink to facilitate the second inspection.

6. The method of claim 5, wherein the inspecting is one of: visual inspecting the package at a shipping destination, or a comparing first images of the package obtained at a shipping source with second images of the package obtained at the shipping destination.

7. The method of claim 5, wherein the tape is applied by a roller.

8. The method of claim 5, wherein the unique pattern is one of: a random pattern created automatically or a predefined pattern created by a user.

* * * * *